D. A. ROBERTS.
DRIVING BELT.
APPLICATION FILED OCT. 5, 1912.
1,049,267.
Patented Dec. 31, 1912.
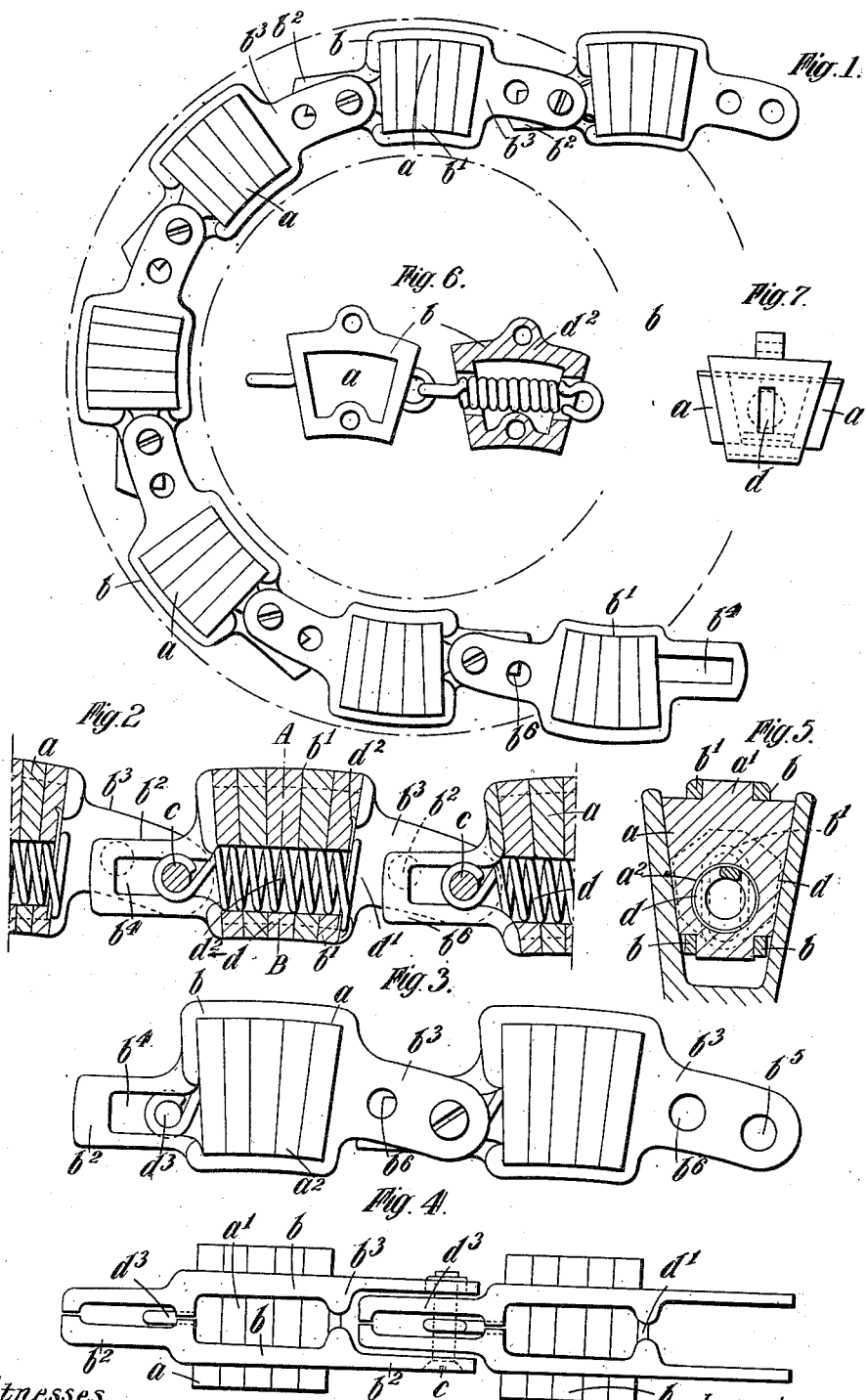

UNITED STATES PATENT OFFICE.

DAVID ALFRED ROBERTS, OF ST. GEORGE BRISTOL, ENGLAND, ASSIGNOR TO CHARLES ANTHONY, OF TWICKENHAM, ENGLAND.

DRIVING-BELT.

1,049,267.  Specification of Letters Patent.  Patented Dec. 31, 1912.

Application filed October 5, 1912. Serial No. 724,219.

*To all whom it may concern:*

Be it known that I, DAVID ALFRED ROBERTS, a subject of the King of Great Britain, residing at 4 Richmond road, St. George Bristol, in the county of Gloucester, England, have invented certain new and useful Improvements in Driving-Belts, of which the following is a specification.

This invention relates to driving belts of the kind comprising a number of metal links which carry frictional blocks of leather or similar material adapted to fit the V-pulleys of motor cycles and other machinery.

According to this invention the metal links or casings provided with the frictional blocks are resiliently connected together to permit of longitudinal extension of the belt, thus rendering the belt more flexible and less liable to breakage than those heretofore proposed. In one construction, each link is slidably secured to the next link by means of a spring passing through and bearing against the frictional block of the next link. In another construction the frictional blocks are held in separate casings which are connected together by helical springs.

In order that the invention may be clearly understood and readily carried into effect, I will describe the same more fully with reference to the accompanying drawings, in which—

Figure 1 is a side elevation of a portion of the improved belt (about full size) passing around a pulley indicated by dot and dash lines. Fig. 2 is a sectional elevation on an enlarged scale of a portion of the belt. Figs. 3 and 4 are respectively a side elevation and a plan on an enlarged scale. Fig. 5 is a cross sectional view through one of the links, taken on the line A, B, of Fig. 2. Figs. 6 and 7 are respectively a part sectional elevation and an end view of a modified form of belt.

Like letters of reference denote similar parts throughout these figures.

$a$ represents one of the frictional blocks of leather or similar material, and $b$ indicates one of the links carrying the frictional blocks which latter in the example shown are each composed of leather sections, suitably shaped to be held in the links. The links are preferably made in the form of casings having two vertical or side parts or frames (see Fig. 4) each part having an opening $b'$ through which projects one of the inclined faces of the frictional blocks or segments. The blocks or segments, in the example shown are formed with lugs or projecting portions $a'$ on their upper and lower surfaces for holding them in position in the two parts of the link. In Figs. 1 to 5, each link is provided with extensions $b^2$ at one end and extensions $b^3$ at the other end. The extensions $b^2$ on one link are provided with slots $b^4$ and fit within or between the extensions $b^3$ of the next link, the latter extensions each having a hole $b^5$ for the reception of a connecting pin $c$ which also passes through the slots. The connecting pin $c$ prevents separation of the side parts or frames of the casings, as will more clearly appear in Fig. 4. Holes $b^6$ may be provided to reduce the weight of the chain. The longitudinal movement of the pin within the slots is limited by a coil spring $d$ which in the example shown extends through a hole $a^2$ in the frictional block and is anchored thereto. In the present example the leather segments for this purpose are formed with circular holes $a^2$ which when the blocks are in position serve to receive the springs. One end of each spring is bent at $d'$ to prevent the spring from being drawn through the hole when pulled in the direction of the arrow and is adapted to bear against a metal plate $d^2$ which is provided at the end of the frictional block (see Fig. 2). The other end of the spring is bent into an eye through which the pin $c$ passes, and by reason of the slots $b^4$ in the inner extensions of one link, the adjacent link carrying the pin $c$ can be moved longitudinally or extended with relation to the next link. Thus the belt is given longitudinal flexibility which is not attained by an ordinary driving chain, and further the said belt is not subjected to the bending or internal stresses to which an ordinary leather belt is subjected.

Referring to Figs. 6 and 7 the frictional blocks $a$ are held in casings $b$, which are not provided with extensions as aforesaid but are connected together by means of the springs $d$. The springs $d$ are pivotally or movably connected to each other to form a flexible chain and the casings $b$ and the blocks $a$ are carried by the springs.

What I claim and desire to secure by Letters Patent of the United States is:—

1. A driving belt for V-pulleys, comprising in combination, a plurality of metal casings, frictional blocks carried by said casings, and resilient connecting means for said casings.

2. A driving belt for V-pulleys, comprising in combination, a plurality of metal casings, frictional blocks carried thereby, and coil springs connecting said casings together.

3. A driving belt for V-pulleys, comprising in combination, a plurality of metal casings, frictional blocks mounted in said casings, and coils passed through and connecting said casings.

4. A driving belt for V-pulleys, comprising in combination, a plurality of metal casings, frictional blocks carried thereby and each provided with a central hole, and resilient connecting means mounted in said holes.

5. A driving belt for V-pulleys, comprising in combination, a plurality of metal casings provided with interfitting extensions, frictional blocks carried thereby, and springs carried by said casings and connected with one of the aforesaid interfitting extensions.

6. A driving belt for V-pulleys, comprising in combination, a plurality of metal casings provided with interfitting extensions, frictional blocks carried by the casings and each having central holes therein, a coil spring mounted in each block and means connecting said springs and casings together.

7. A driving belt for V-pulleys, comprising in combination, a plurality of casings, frictional blocks carried thereby, springs carried by said casings, and connecting members coöperating with said springs and casings.

8. A driving belt for V-pulleys, comprising in combination, a plurality of casings each composed of two frame members provided with extensions, frictional blocks carried by said frame members and each having a central longitudinal hole, springs mounted in said holes, one end of each spring being larger than said holes, and a pin carried by one extension of each frame member, each spring being provided with a hook member engaging one of said pins.

In testimony whereof I affix my signature in presence of two witnesses.

DAVID ALFRED ROBERTS.

Witnesses:
   J. ANTHONY PARKER,
   F. C. SMITH.

---

Copies of this patent may be obtained for five cents each, by addressing the "Commissioner of Patents, Washington, D. C."